United States Patent [19]

Davy, Sr.

[11] 4,075,520
[45] Feb. 21, 1978

[54] WHEEL SPEED SENSOR
[75] Inventor: David Larry Davy, Sr., Troy, Ohio
[73] Assignee: The B. F. Goodrich Company, Akron, Ohio
[21] Appl. No.: 683,694
[22] Filed: May 6, 1976
[51] Int. Cl.² ............................................. H02K 19/24
[52] U.S. Cl. ..................................................... 310/168
[58] Field of Search .............................. 310/155, 168; 329/170–179

[56] References Cited
U.S. PATENT DOCUMENTS

| | | | |
|---|---|---|---|
| 3,793,545 | 2/1974 | Leiber et al. | 310/168 |
| 3,890,517 | 6/1975 | Marsh et al. | 310/168 |

Primary Examiner—Donovan F. Duggan
Attorney, Agent, or Firm—Harry F. Pepper, Jr.; W. A. Shira, Jr.

[57] ABSTRACT

An inboard type sensor for a vehicle anti-skid system is mounted adjacent a wheel assembly and disposed within an annular bored housing. The housing has situated therein a split tubular springlike sleeve which is adapted to exert a radially inward compressive force upon the sensor thus preventing the sensor from undesirable axial or rotational movement after the sensor is properly positioned. The sleeve is locked within the bushing to prevent its axial or rotational movement relative to the housing.

4 Claims, 7 Drawing Figures

U.S. Patent  Feb. 21, 1978  4,075,520
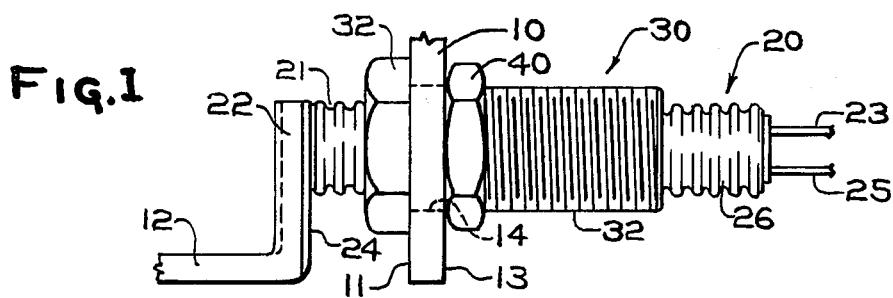
FIG. 1
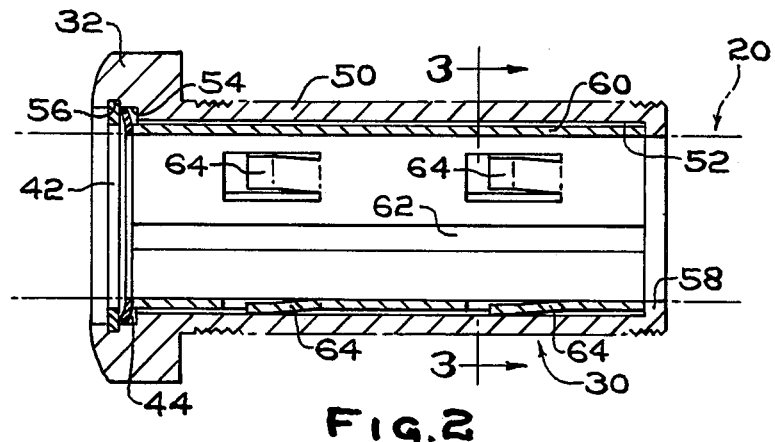
FIG. 2
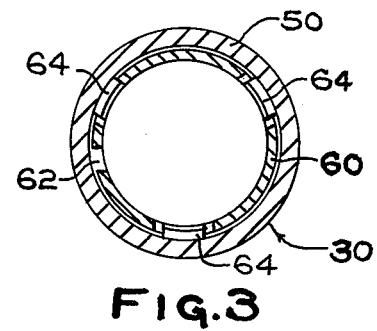
FIG. 3
FIG. 4
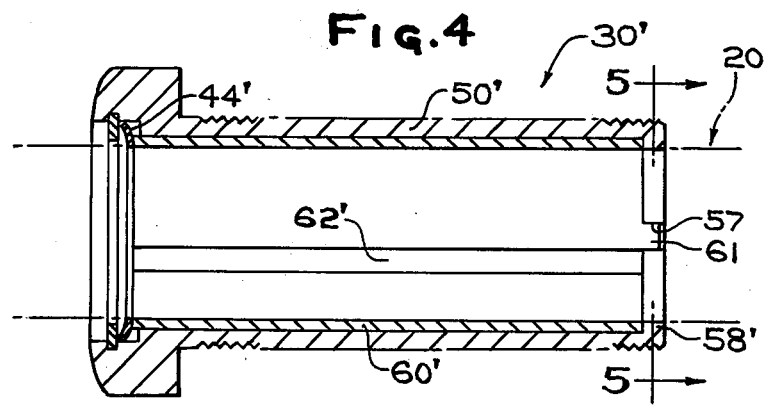
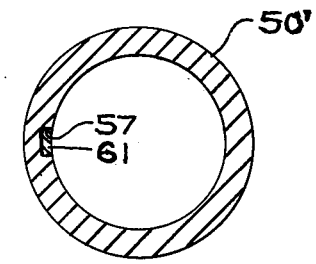
FIG. 5
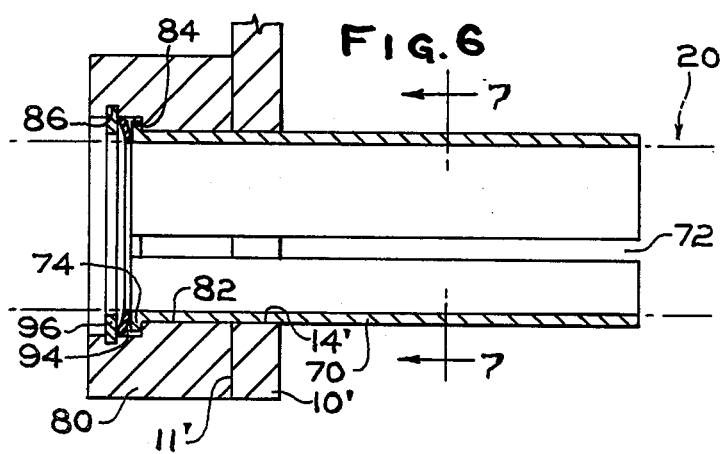
FIG. 6
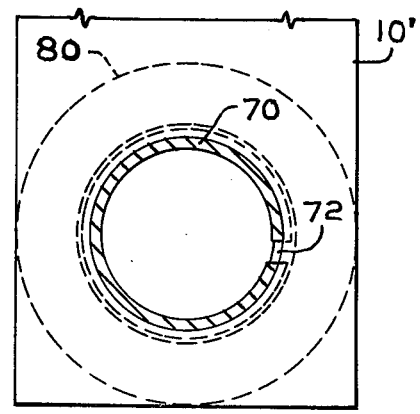
FIG. 7

WHEEL SPEED SENSOR

BACKGROUND

This invention relates to wheel speed sensors and particularly to wheel speed sensors for vehicle anti-skid systems.

Devices for sensing vehicle wheel speeds, and particularly changes in wheel speeds are important components in braking anti-skid or skid control systems in use today. In such anti-skid systems, these sensing devices generate signals which are carried to an electronic controller adapted to control a brake pressure modulation valve. Because the frequency of the signal from the sensing device is proportional to wheel speed, a properly programmed controller can modulate brake pressure so as to reduce or preclude wheel skids or locks when the vehicle is being braked.

Most anti-skid sensing devices operate to generate electrical signals created by a changing magnetic flux field, where a rotor or exciter rotates with the rotating portions of the wheel relative to a nonrotating stator or pick-up device. "Outboard" sensing devices (i.e., devices generally located axially outwardly of the wheel) normally include a rotor and stator type arrangement, while "inboard" sensing devices (i.e., devices generally located axially inwardly of the wheel) normally include an exciter and pick-up type arrangement.

In outboard sensing devices, a toothed or notched ferromagnetic rotor, operatively connected to a rotary portion of the wheel assembly, is disposed adjacent a toothed or notched ferromagnetic stator, operatively connected to a nonrotating portion, such as the axle. Proper disposition of a permanent magnet and coil relative to the rotor and stator enables variable frequency currents or signals to be sent to a controller.

In inboard sensing devices, an exciter having a specially constructed or contoured annular surface portion is operatively connected to a rotatable structure of the wheel and brake assembly, such as a wheel hub or rotatable brake component. The exciter is positioned to rotate past a pick-up device or "sensor" operatively connected to a nonrotable structure of the wheel and brake assembly such as an axle or nonrotatable brake component. The sensor, which comprises a magnet surrounded by a coil, senses changing magnetic field of flux caused by the adjacent rotation of the specially designed surface of the exciter. The changing flux field induces a variable signal in the sensor coil which is thereupon carried to the controller.

Sensor components of inboard type sensing devices are generally of two types, "bipolar" or "unipolar". Bipolar sensors usually feature two spaced prongs or flanges which straddle the rotatable exciter, such that the exciter rotates within the gap between the spaced prongs or flanges. Unipolar sensors usually feature a single pole portion or surface which is in nearly direct contact with the exciter. The bipolar type sensor is relatively insensitive to gap fluctuations caused by any relative movements between it and the exciter. Unipolar sensors, however, are sensitive to relative movement, or changes in position between it and the exciter.

Because of the sensitivity of unipolar type sensors, the manner in which such sensors are mounted is important. Such sensors must be mounted to prevent the sensor from undergoing any axial and/or rotational movement relative to the nonrotatable portion of the wheel assembly to which it is secured once the sensor has been properly positioned adjacent the exciter.

SUMMARY

It is an object of the present invention to provide an improved mounting means for an inboard type wheel speed sensor.

It is another object of the present invention to provide a mounting means for inboard type sensors which prevents the sensor from axial or rotational movement relative to the structure in which the sensor is mounted.

It is still a further object of the present invention to provide a sensor securably mounted in a portion of a wheel assembly so that undesirable movement of the sensor is prevented during operation.

These and other objects, which will become evident from the following detailed description, are achieved by mounting a sensor within an annular bored housing having a split spring-like, tubular, sleeve member disposed within the bore of the housing. Forcing the sensor through the sleeve causes expansion of the sleeve creating an opposite compressive or grasping force to be exerted by the sleeve upon the sensor. A lock ring and curved lock washer are provided in the mounting assembly to hold the sleeve member against axial movement relative to the bushing. The sleeve itself is also provided with special means which cooperate with the housing to prevent undesirable rotational movement of the sleeve within the housing.

BRIEF DESCRIPTION OF THE DRAWING

In the accompanying drawings, the invention according to presently preferred embodiments is illustrated wherein:

FIG. 1 is a general representation of an inboard type sensing device mounted in accordance with the present invention;

FIG. 2 shows a longitudinal section of a preferred form of mounting device for the sensor represented in FIG. 1;

FIG. 3 is a sectional view of the mounting device of FIG. 2 taken along lines 3—3 of FIG. 2;

FIG. 4 shows a longitudinal section of another preferred embodiment of a mounting device for a sensor as represented in FIG. 1;

FIG. 5 is a sectional view of a mounting device of FIG. 4 taken along lines 5—5 of FIG. 4;

FIG. 6 is a longitudinal section of an alternative mounting device for a sensor of the type represented in FIG. 1;

FIG. 7 is a sectional view of a mounting device taken along lines 7—7 of FIG. 6.

DETAILED DESCRIPTION

In FIG. 1, an inboard wheel speed sensing device component for an anti-skid system for a vehicle wheel and brake assembly is shown wherein structural member 10 represents an inboard nonrotatable part of the wheel and brake assembly (not shown) such as an axle flange or a flange extending from a nonrotating brake torque plate. Structural member 12 represents an inboard rotatable part of the wheel and brake assembly and can be, for example, an extension from the rotatable wheel hub or a rotatable part of the brake such as a brake disc adapter.

The sensing device component shown in FIG. 1 comprises an annular rotatable exciter ring 22 of ferromagnetic material and a stationary pick-up or sensor 20. The exact details of exciter ring 22 and sensor 20 are not particularly significant to the present invention. The exciter ring 22 may be an integral extension of rotatable structure 12, as shown, or may be a separate disc-like member otherwise secured to member 12 by suitable means, such as welding. The exciter ring has a specially constructed surface 24 of annularly spaced teeth, ripples, or other such irregular surface characteristics as are common for exciter rings. The exciter ring is disposed so that its specially constructed surface 24 rotates past an end-portion or sensing head 21 of sensor 20.

The sensor 20 is preferably any of the known unipilar-type sensors which include a magnet and coil arrangement (not shown) mounted in the head 21 adapted to induce a varying current caused by rotation of exciter ring past the magnet. The induced current is transmitted by way of the coil leads 23 and 25 to another component of the anti-skid system housing such as a controller. The sensor 20 comprises a cylindrical insulating housing, usually of a nonmagnetic material, such as plastic, which encases the aforementioned magnet and coil. The housing may have an exterior surface featuring grooves 26 to enhance its mounting characteristics.

The sensor 20 is secured to stationary structure 10 by mounting means 30, the details of which form part of the present invention. The mounting means 30 extends through an opening 14 in structure 10 and includes a hexagonally contoured head portion 32 adapted to be held against outward face 11 of structure 10. The portion of mounting means 30 on the inward side of structure 10 includes a threaded outer surface 34 adaped to receive an internally threaded hexagonally contoured nut 40 which is tightenable against inward face 13 of structure 10.

Further details of mounting means 30 in accordance with a presently preferred embodiment of the present invention are shown in FIGS. 2 and 3. In FIGS. 2 and 3, where portions of sensor 20 are shown in phantom for the sake of clarity, mounting means 30 comprises an outer tubular housing 30 having a cylindrical bore 52 extending therethrough. The bore 52 increases in diameter at grooves 54 and 56 within head portion 32 for reception of a curved, spring washer 44 and snap ring 42, respectively. The bored housing 50 also has an annular flange 58 at the end of housing 50 opposite head portion 32.

A tubular spring-like sleeve 60 is disposed within the housing bore 52. The sleeve 60 is provided with a longitudinally extending separation or split 62 and is designed to be forced radially outwardly against the surface of bore 52 as shown in FIG. 2 by the presence of sensor 20. When forced radially outwardly as shown in FIGS. 2 and 3, sleeve 60 responds by exerting an opposing radially inward force upon sensor 20 because of the sleeve's tendency to return to its original unexpanded state. One end of sleeve 60 is adapted to engage the annular flange 58 of housing 50 while the other end of sleeve 60 is disposed for engagement by curved spring washer 44. Mounted in this manner, sleeve 60 is locked against axial movement relative to housing 50.

The sleeve 50 is further provided with a series of tabs 64 raised from the surface thereof which tabs frictionally engage the wall of bore 52. These tabs 64 restrain the sleeve 50 against rotational movement relative to housing 50. The number and arrangement of friction tabs 64 formed on sleeve 60 can be any found suitable to effectively restrain the sleeve against rotation. In the embodiment shown, two axially spaced annular rows of three tabs each are provided totaling six tabs in all.

The embodiment shown in FIGS. 4 and 5 is a modified mounting means 30' substantially similar to mounting means 30 of FIGS. 2 and 3.

In FIGS. 4 and 5, mounting means 30' comprises a housing 50' with bored portions similar to those in housing 50 of mounting means 30. Annular flange 58' of housing 50' is provided with a recess 57. Tubular sleeve 60' with longitudinal split 62' is provided with a tab 61 extending from its end which is adapted to fit within recess 57. Sleeve 60' has an uninterrupted surface as compared to sleeve 60 with tabs 64 of mounting means 30, and is restrained against rotation by means of tab 61 fitted within recess 57. Sleeve 60' is locked against axial movement in the same manner as described hereinabove for sleeve 60. Specifically, sleeve 60' is held between curved spring washer 44' and flange 58' as shown.

In the embodiment shown in FIGS. 6 and 7, a tubular sleeve 70 is shown provided with a longitudinal split or separation 72. This sleeve is mounted within a housing 80 having bored portions 82, 84 and 86. As seen, housing 80 is axially shorter than previously described having 50 and 50'. Bores 86 and 84 are adapted to receive snap ring 96 and spring washer 94 respectively while bore 82 receives only portion of the length of tubular sleeve 70. A flange 74 is provided on the forward end of sleeve 70 which cooperates with spring washer to restrain sleeve 70 from rotation relative to housing 80. Spring washer 94 also functions to lock sleeve 70 against axial movement within housing 80. Mounting means in accordance with this embodiment are particularly effective in more confined areas where the size of openings within a nonrotating structure such as 10' is a factor. In this case, the shoter housing 80 can be welded upon the outward face 11' of structure 10' and only the split sleeve 70 extends through the opening 14' in structure 10'.

The foregoing structures described are embodiments of the invention as presently preferred and modifications are possible which fall within the scope of the invention which is to be measured by the following claims.

I claim:

1. In a wheel speed sensing device for a wheel and brake assembly which sensing device comprises an elongated, substantially cylindrically contoured sensor and means to mount said sensor to a nonrotatable portion of said wheel and brake assembly such that said sensor is disposed in a fixed preselected position relative to a rotating portion of said wheel and brake assembly, the improvement wherein said mounting means comprises
   A. an outer annular housing having a central bore extending therethrough of sufficient size to receive said sensor;
   B. a longitudinally split, spring-like tubular sleeve disposed within said housing bore and substantially surrounding and engaging said sensor with a radially inwardly directed spring force, said sleeve having restraining means associated therewith to resist rotational movement of said sleeve relative to said housing bore, and
   C. means to lock said sleeve against axial movement relative to said housing.

2. The improvement defined in claim 1 wherein said restraining means comprises at least one tab raised from the surface of said sleeve and adapted to engage the surface of said housing base.

3. The improvement defined in claim 1 wherein said restraining means comprises a tab extending from an end of said sleeve and adapted to engage a portion of said housing.

4. The improvement defined in claim 1 wherein said restraining means includes an annular flange located adjacent an end of said sleeve adapted to engage a portion of said housing.

* * * * *